United States Patent
Ariga et al.

(10) Patent No.: US 9,600,894 B2
(45) Date of Patent: Mar. 21, 2017

(54) IMAGE PROCESSING APPARATUS AND COMPUTER-READABLE STORAGE MEDIUM

(71) Applicant: TOSHIBA TEC KABUSHIKI KAISHA, Tokyo (JP)

(72) Inventors: Norimasa Ariga, Izunokuni Shizuoka (JP); Kazuki Taira, Tokyo (JP); So Ishika, Ome Tokyo (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 23 days.

(21) Appl. No.: 14/680,904

(22) Filed: Apr. 7, 2015

(65) Prior Publication Data

US 2016/0300360 A1 Oct. 13, 2016

(51) Int. Cl.
*G06K 9/00* (2006.01)
*G06T 7/00* (2006.01)
*G06K 9/34* (2006.01)

(52) U.S. Cl.
CPC ........ *G06T 7/0087* (2013.01); *G06K 9/00791* (2013.01); *G06K 9/342* (2013.01); *G06T 7/0081* (2013.01); *G06T 2207/30248* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,991,752 | A * | 11/1999 | Fukuda | G06F 17/30607 |
| 6,466,687 | B1 * | 10/2002 | Uppaluri | G06T 7/0012 382/128 |
| 7,492,937 | B2 * | 2/2009 | Ramsay | G06K 9/3241 378/57 |
| 2006/0013463 | A1 * | 1/2006 | Ramsay | G06K 9/36 382/132 |
| 2008/0069396 | A1 * | 3/2008 | He | G06T 1/0028 382/100 |
| 2012/0075440 | A1 * | 3/2012 | Ahuja | G06T 7/0081 348/61 |
| 2013/0336527 | A1 * | 12/2013 | Nechyba | H04N 5/228 382/103 |
| 2015/0045986 | A1 * | 2/2015 | Kan | B60W 40/08 701/1 |
| 2015/0147740 | A1 * | 5/2015 | Barnhart | G09B 7/00 434/322 |

(Continued)

FOREIGN PATENT DOCUMENTS

JP 4423524 3/2010

*Primary Examiner* — Anand Bhatnagar
(74) *Attorney, Agent, or Firm* — Patterson & Sheridan, LLP (57) ABSTRACT

According to one embodiment, an image processing apparatus includes a dividing unit, a calculating unit, a determining unit, and an output unit. The dividing unit is configured to divide an image into a plurality of regions. The calculating unit is configured to calculate a standard deviation and an entropy per region divided by the dividing unit based on tone information of pixels comprising each region, and calculate a ratio between the standard deviation and the entropy. The determining unit is configured to determine a region in which the ratio exceeds a reference value. The output unit is configured to output information based on a determination result obtained by the determining unit.

20 Claims, 10 Drawing Sheets

(56) References Cited

U.S. PATENT DOCUMENTS

2015/0278224 A1* 10/2015 Jaber ................... G06F 17/3053
  707/749
2015/0324982 A1* 11/2015 Kim ........................ A61B 6/03
  382/131

* cited by examiner

σ of each block

F I G. 6C

S of each block

F I G. 6D

SER of each block

σ of each block

| 31 | 35 | 21 | 35 | 36 | 38 | 20 | 43 |
|---|---|---|---|---|---|---|---|
| 31 | 32 | 26 | 25 | 32 | 33 | 26 | 23 |
| 31 | 31 | 35 | 27 | 24 | 30 | 27 | 32 |
| 31 | 22 | 34 | 79 | 80 | 32 | 20 | 31 |
| 34 | 33 | 39 | 78 | 79 | 36 | 38 | 43 |
| 36 | 29 | 24 | 33 | 65 | 32 | 34 | 25 |
| 37 | 43 | 34 | 37 | 53 | 34 | 25 | 30 |
| 25 | 25 | 31 | 33 | 64 | 31 | 25 | 29 |

FIG. 7C

S of each block

| 46 | 47 | 43 | 46 | 48 | 49 | 43 | 49 |
|---|---|---|---|---|---|---|---|
| 47 | 47 | 46 | 45 | 47 | 48 | 46 | 44 |
| 47 | 47 | 48 | 44 | 42 | 46 | 46 | 47 |
| 46 | 43 | 47 | 39 | 42 | 45 | 43 | 46 |
| 47 | 47 | 48 | 36 | 37 | 47 | 48 | 47 |
| 48 | 46 | 44 | 46 | 44 | 47 | 48 | 45 |
| 48 | 48 | 47 | 47 | 40 | 48 | 45 | 46 |
| 45 | 44 | 47 | 47 | 44 | 47 | 45 | 46 |

FIG. 7D

SER of each block

| 6 | 7 | 4 | 7 | 7 | 7 | 4 | 8 |
|---|---|---|---|---|---|---|---|
| 6 | 6 | 5 | 5 | 6 | 7 | 5 | 5 |
| 6 | 6 | 7 | 6 | 5 | 6 | 5 | 6 |
| 6 | 5 | 7 | 20 | 19 | 7 | 4 | 6 |
| 7 | 6 | 8 | 21 | 21 | 7 | 7 | 9 |
| 7 | 6 | 5 | 7 | 14 | 6 | 7 | 5 |
| 7 | 9 | 7 | 7 | 13 | 7 | 5 | 6 |
| 5 | 5 | 6 | 7 | 14 | 6 | 5 | 6 |

σ of each block

FIG. 8C

S of each block

FIG. 8D

SER of each block

IMAGE PROCESSING APPARATUS AND COMPUTER-READABLE STORAGE MEDIUM

FIELD

Embodiments described herein, relate generally to an image processing apparatus and a computer-readable storage medium.

BACKGROUND

In general, a technique to detect symbols (including letters, numbers and marks) in an image is utilized in various fields. In the field of automobiles, a technique to detect traffic signs in an image is developed for the purpose of calling a driver's attention or controlling automatic operation. For example, this technique detects a specific single color in an image to detect a traffic sign.

However, the specific single color does not necessarily correspond to the portion of a symbol. Furthermore, to detect a single color regarding a plurality of colors would increase processing time.

The embodiments described herein solve the above problem by providing an image processing apparatus which detects the portion of a symbol in an image in a short time, and a computer-readable storage medium thereof.

DETAILED DESCRIPTION

In general, according to one embodiment, an image processing apparatus includes a dividing unit, a calculating unit, a determining unit, and an output unit. The dividing unit is configured to divide an image into a plurality of regions. The calculating unit is configured to calculate a standard deviation and an entropy per region divided by the dividing unit based on tone information of pixels comprising each region, and calculate a ratio between the standard deviation and the entropy. The determining unit is configured to determine a region in which the ratio exceeds a reference value. The output unit is configured to output information based on a determination result obtained by the determining unit.

Hereinafter, embodiments will be explained with reference to the drawings.

First Embodiment

Figure 1:
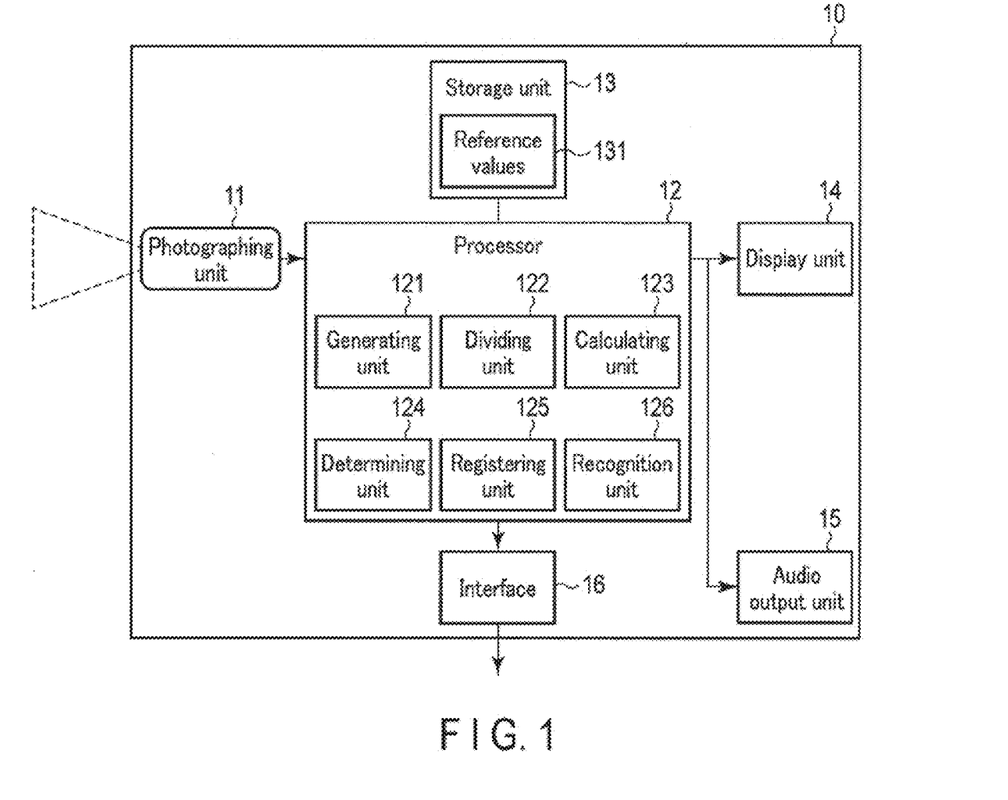
FIG. 1 is a block diagram illustrating an image processing apparatus.

The first embodiment is explained below. FIG. 1 is a block diagram of an image processing apparatus 10 according to the first embodiment.

The image processing apparatus 10 comprises a photographing unit 11, a processor 12, a storage unit 13, a display unit 14, an audio-output unit 15, and an interface 16. The image processing apparatus 10 does not need to comprise all of these elements. For example, the image processing apparatus 10 may at least comprise the processor 12 and the storage unit 13.

The photographing unit 11 is a camera which photographs a target. The photographing unit 11 is, for example, an on-vehicle camera. The photographing unit 11 may also be a camera for photographing a target as a moving image or a still image. The photographing unit 11 sends data of an image to the processor 12.

The processor 12 corresponds to the center portion of the image processing apparatus 10. The processor 12 controls each element of the image processing apparatus 10 in accordance with an operating system or an application program. The processor 12 comprises a generating unit 121, a dividing unit 122, a calculating unit 123, a determining unit 124, a registering unit 125, and a recognition unit 126. The processor 12 uses these elements to recognize a target in an image obtained from the photographing unit 11. The target is a symbol portion projected in an image. The concept of a symbol includes letters, numbers and marks. Generally, in a gray scale image, a symbol portion corresponds to a binary image portion. Here, the detection of a position of a binary image portion in an image will be explained. However, such detection is not limited to binary detection, and thus may be ternary or more. The processing details of the generating unit 121, the dividing unit 122, the calculating unit 123, the determining unit 124, the registering unit 125, and the recognition unit 126 will be explained later on.

The processor 12 sends a video signal to the display unit 14. The processor 12 sends an audio signal to the audio output unit 15. The processor 12 sends a control signal, which is for an external device connected to the image processing apparatus 10, to the interface 16.

The storage unit 13 includes a memory which stores the operating system and the application program. The storage unit 13 further includes a memory that serves as a work area necessary for the processing performed by the processor 22. The storage unit 13 further includes a memory that stores data necessary for the processing performed by the processor 12. The storage unit 13 stores reference values 131. The reference values 131 are threshold values used for detecting positions of binary image portions in the image.

The display unit 14 is a display which displays videos based on the video signal from the processor 14. The audio output unit 15 is a speaker which outputs audio based on the audio signal from the processor 12. The interface 16 connects the external device with the image processing apparatus 10. The interface 16 sends the control signal from the processor 12 to the external device. The display unit 14, the audio output unit 15, and the interface 16 are output units which output information based on the determination result regarding the position of the binary image portion by the processor.

Figure 2:
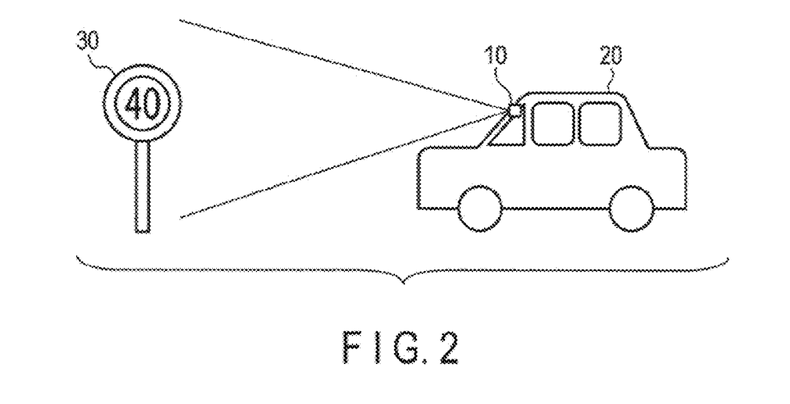
FIG. 2 is a diagram illustrating a moving vehicle.

FIG. 2 is a diagram illustrating a moving vehicle 20 according to the first embodiment. For example, the moving vehicle 20 is an automobile. The moving vehicle 20 is equipped with the image processing apparatus 10. The photographing unit 11 photographs a target while the moving vehicle 20 travels. The target in the first embodiment is a traffic sign 30.

Figure 3A:
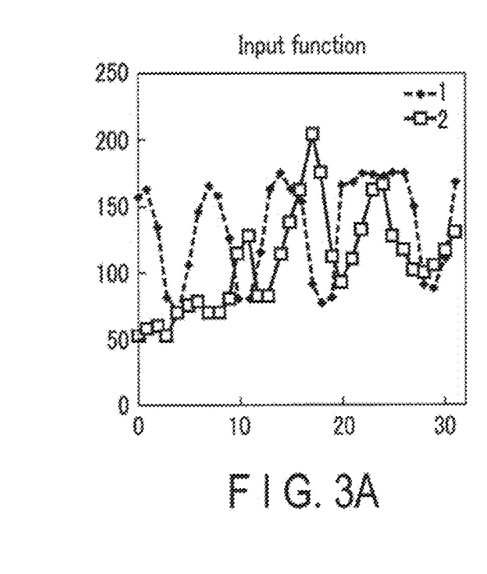
FIG. 3A, FIG. 3B, and FIG. 3C are a diagram explaining an index used for recognizing a target.
Figure 3B:
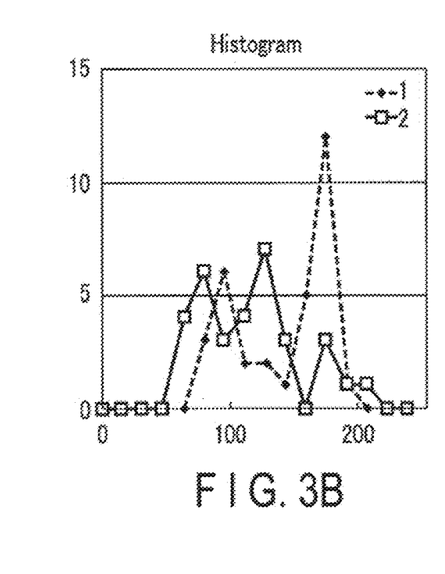
Figure 3C:
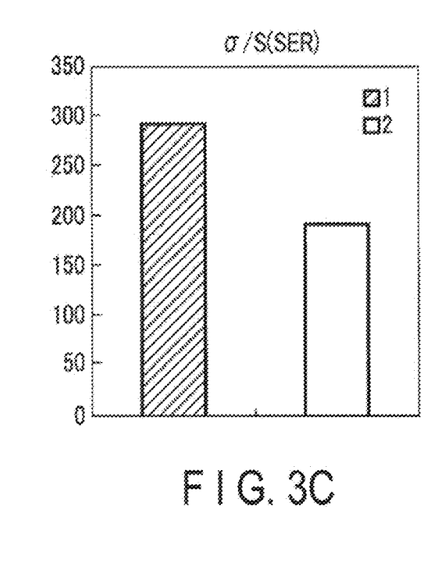

An example of calculating an index used in recognizing the target is explained using FIG. 3A, FIG. 3B, and FIG. 3C.

FIG. 3A, FIG. 3B, and FIG. 3C show data of two different images. In FIG. 3, data indicated as "1" corresponds to a first image. The first image is a geometrically patterned image in clear black and white. In FIG. 3, data indicated as "2" corresponds to a second image. The second image is a clear natural image. FIG. 3A is a graph showing data of any one line of each of the first image and the second image as an input function. The horizontal axis indicates the coordinate of each pixel included in the any one line, and the vertical axis indicates a tone (pixel value). The processor 12 generates the input function from data of one image. The any one line may correspond to the horizontal axis or the vertical axis of the entire one image.

FIG. 3B is a graph showing a histogram of each of the first image and the second image. The horizontal axis indicates a tone, and the vertical axis indicates the number of pixels. The histogram shows the distribution of pixels included in any one line of one image, and is tone information of pixels that comprise the image. The processor 12 generates the histogram from the input function. The two peaks in the histogram become sharper as the binary image portion included in the image becomes clearer. Furthermore, the positions of the two peaks in the histogram become more distant as the binary image portion included in the image becomes clearer.

FIG. 3C is a graph showing the ratio between a standard deviation σ and an entropy S (σ/S) (hereinafter, referred to as SER) in each of the first image and the second image. The processor 12 calculates the standard deviation σ and the entropy S based on the histogram using the following formula. Subsequently, the processor 12 calculates the SER based on the standard deviation σ and the entropy S.

The formula of the standard deviation σ is as follows.

$$\sigma = \sqrt{\frac{\sum (x_i - m)^2}{n}}$$

wherein, $$m = \frac{\sum x_i}{n}$$

The formula of the entropy S is as follows.

$$S = \sum \left(-\frac{n_i}{n} \log\left(\frac{n_i}{n}\right)\right)$$

Here, $n_i$ is the number of pixels of tone i in the histogram, and n is the total number of pixels in the histogram.

The standard deviation σ is an index (image features) expressing separation of at least two peaks in the histogram. The entropy S is an index (image features) expressing sharpness in the peaks in the histogram. The standard deviation σ becomes larger as the two peaks become more distant in the histogram. The entropy S becomes smaller as the two peaks become sharper in the histogram. If the standard deviation σ is large and the entropy S is small, the SER is large.

Referring to the graph on FIG. 3C, the SER of the first image is larger than the SER of the second image. Therefore, the SER is effective as an index (image features) showing whether or not the image includes a region equal to or greater than a predetermined region of the binary image portion. Furthermore, since the clarity of the binary image portion changes depending on the magnitude of the SER, the SER is effective as an index (image features) for expressing the clarity of the binary image portion quantitatively.

The SER should be a ratio of an index (standard deviation σ is as an example) expressing separation of at least two peaks in the histogram and an index (entropy S is an example) expressing sharpness of the peaks in the histogram. Therefore, the processor 12 may calculate the SER using indexes other than the standard deviation σ and the entropy S. For example, the magnitude of the standard deviation σ changes depending on the brightness of the entire image. Therefore, it is favorable for the processor 12 to calculate the SER using a coefficient of variation obtained by dividing the standard deviation σ by an average value m, instead of using the standard deviation σ. The processor 12 may also calculate the SER using variance which is a square of the standard deviation σ, instead of using the standard deviation σ. When calculating the entropy S, the processor 12 divides the number of pixels ni of each tone by the number of the entire pixels n. However, the number of pixels ni of each tone does not have to be divided by the number of the entire pixels n. The SER is not limited to a value that is calculated based on any line of each of the first image and the second image. For example, the SER may be an average value of a plurality of SERs calculated from any plurality of lines or all of the lines of the first image.

The processor 12 can not only calculate one SER from the entire image in the manner mentioned above, but also can calculate the SER of any block extracted from the image. In this case, the processor 12 can generate a histogram of any block in the same manner as above, and calculate the SER of the any block based on the histogram.

The difference between the SER of a symbol image and the SER of a natural image will be explained using FIG. 4A, FIG. 4B, FIG. 5A, and FIG. 5B.

Figure 4A:
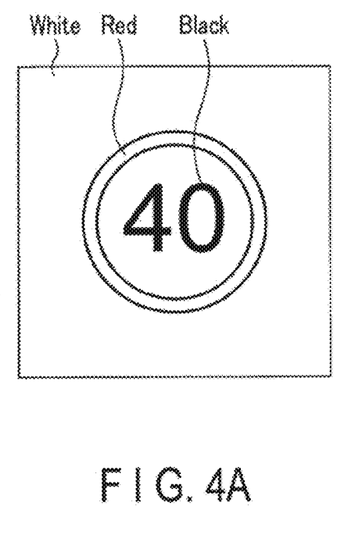
FIG. 4A, and FIG. 4B are a diagram showing an SER of a traffic sign image.
Figure 4B:
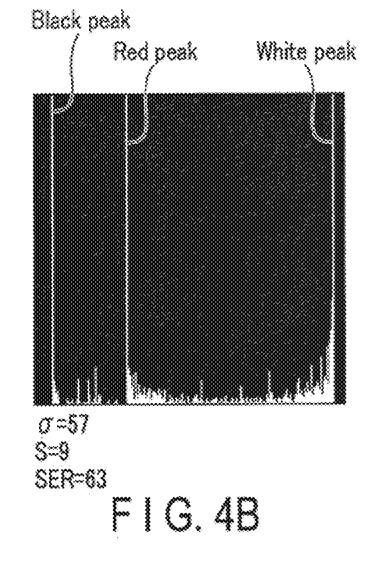

FIG. 4B is a diagram showing the SER of an image of a symbol according to the first embodiment. The figure on FIG. 4A shows a third image. The third image is a traffic sign which is an example of an image of a symbol. The image of the traffic sign consists of white, red and black colors. The diagram on FIG. 4B shows a histogram generated from the third image shown on the left side of FIG. 4 by the processor 12. Referring to the diagram on FIG. 4B, each of the peaks of the black, the red, and the white colors is sharp and are distant from each other. The processor 12 calculates the standard deviation σ, the entropy S, and the SER of the third image based on the histogram shown on FIG. 4B. As shown in FIG. 4B, in the third image, the standard deviation σ is 57, the entropy S is 9, and the SER is 63.

Figure 5A:
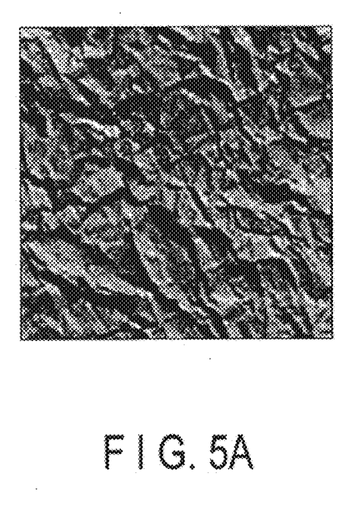
FIG. 5A, and FIG. 5B are a diagram showing an SER of a natural image.
Figure 5B:
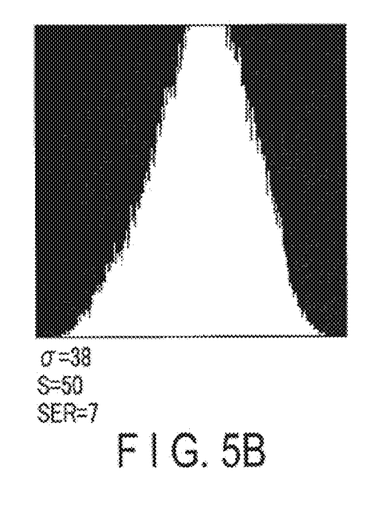

FIG. 5B is a diagram showing the SER of a natural image according to the first embodiment. The figure on FIG. 5A shows a fourth image. The fourth image is a natural image.

The diagram on FIG. 5B shows a histogram generated from the fourth image shown on FIG. 5A by the processor 12. The processor 12 calculates the standard deviation σ, the entropy S, and the SER of the fourth image based on the histogram shown on FIG. 5B. As shown in FIG. 5B, in the fourth image, the standard deviation σ is 38, the entropy S is 50, and the SER is 7.

When comparing FIG. 4B and FIG. 5B, the SER of the symbol image is larger than the SER of the natural image. This is because the symbol image includes many binary image portions. Therefore, the SER is effective as an index showing whether or not the image includes a region equal to or greater than a predetermined region of the binary image portion. In other words, the SER is effective as an index showing whether or not the image includes a symbol portion equal to or greater than a predetermined region. Furthermore, the SER is effective as an index expressing the clarity of the binary image portion quantitatively. In other words, the SER is effective as an index expressing the clarity of the symbol portion quantitatively.

FIGS. 6A-6E, 7A-7E, and 8A-8E explain how a symbol portion in an image is recognized.

Figure 6A:
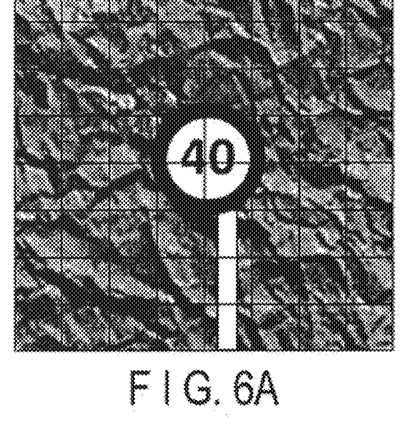
FIG. 6A, FIG. 6B, FIG. 6C, FIG. 6D, and FIG. 6E are a diagram showing recognition of a target.

FIGS. 6A-6E are diagrams showing how a symbol portion in a fifth image is recognized according to the first embodiment. The figure on FIG. 6A shows a fifth image. The fifth image is an image of a traffic sign projected in a natural image. The traffic sign is a symbol portion in the fifth image. The fifth image is an image in focus.

Figure 6B:
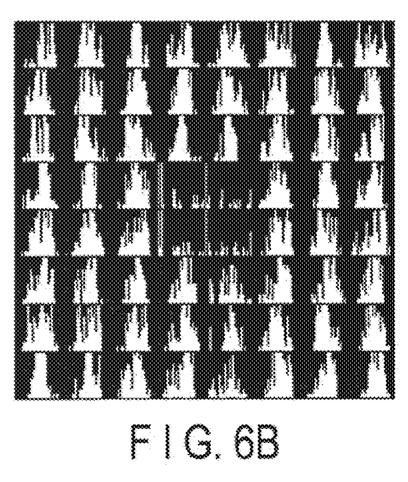

The processor 12 divides the fifth image into a plurality of blocks (regions). Referring to FIG. 6A, the processor 12 divides the fifth image into 64 even blocks. The image may be divided into any number of blocks. The size of the divided blocks does not have to be even. The processor 12 generates a histogram of each block based on data of any one line per block. The histogram is tone information of pixels that comprise each block. The any one line may correspond to the horizontal axis or the vertical axis of each block. The diagram on FIG. 6B is a two-dimensional histogram map which is obtained by lining up the histogram at a position corresponding to each block of the fifth image. The processor 12 calculates a standard deviation σ and an entropy S per block of the fifth image based on each of the histograms. The processor 12 calculates an SER per block of the fifth image. The SER of each block may be an average value of a plurality of SERs calculated from any plurality of lines or all of the lines of each block.

Figure 6C:
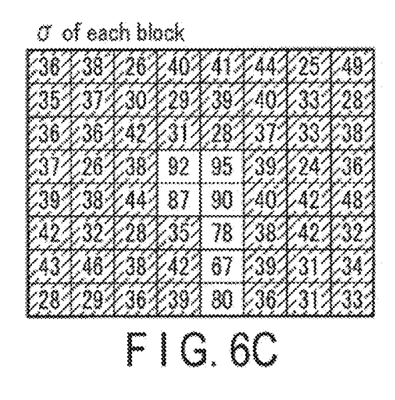
Figure 6D:
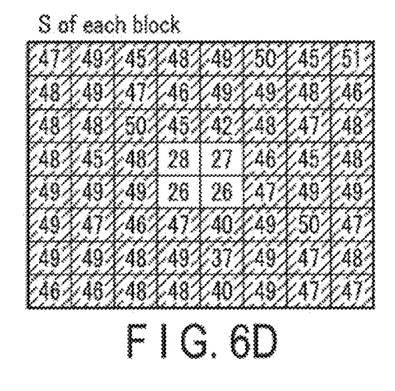

The diagram on FIG. 6C is a two-dimensional σ map which is obtained by lining up the value of the standard deviation σ at a position corresponding to each block of the fifth image. The diagram on FIG. 6D is a two-dimensional S map which is obtained by lining up the value of the entropy S at a position corresponding to each block of the fifth image. The diagram on FIG. 6E is a two-dimensional SER map which is obtained by lining up the value of the SER at a position corresponding to each block of the fifth image.

Referring to the diagram on FIG. 6C, the standard deviation σ of the blocks corresponding to the position of the traffic sign is approximately twice that of the blocks corresponding to the position of the natural image. Therefore, the standard deviation σ of the blocks corresponding to the position of the traffic sign is significantly different from the standard deviation σ of the blocks corresponding to the position of the natural image.

Referring to the diagram on FIG. 6D, the entropy S of the blocks corresponding to the position of the traffic sign is approximately half that of the blocks corresponding to the position of the natural image. Therefore, the entropy S of the blocks corresponding to the position of the traffic sign is significantly different from the entropy S of the blocks corresponding to the position of the natural image.

Figure 6E:
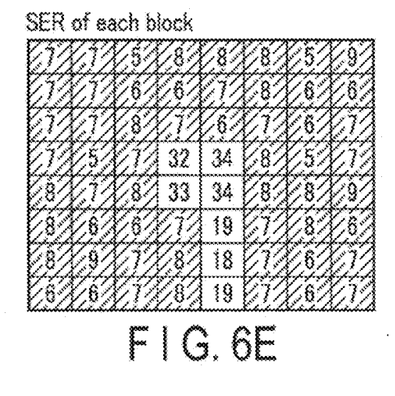

Referring to the diagram on FIG. 6E, the SER of the blocks corresponding to the position of the traffic sign is approximately at least twice that of the blocks corresponding to the position of the natural image. Therefore, the SER of the blocks corresponding to the position of the traffic sign is significantly different from the SER of the blocks corresponding to the position of the natural image. The diagram on FIG. 6E shows blanks in the blocks having an SER exceeding a first threshold value.

The processor 12 compares the SER of each block of the fifth image for recognizing the traffic sign with the first threshold value. The first threshold value corresponds to a first reference value stored in the storage unit 13. The first reference value is a reference for determining whether or not each block includes a binary image portion equal to or more than a predetermined region. The first reference value is a value that is set as desired. For example, the first reference value may correspond to the value of the SER of a clear binary image photographed in advance. The processor 12 determines the blocks whose SER exceeds the first threshold value among the plurality of blocks in the fifth image. The blocks whose SER exceeds the first threshold value are blocks including the binary image portion equal to or greater than a predetermined region. As can be seen from the diagram on FIG. 6E, blocks whose SER exceeds the first threshold value correspond to the position of the traffic sign. However, the blocks whose SER does not exceed the first reference value are the blocks which do not include the binary image portion equal to or greater than a predetermined region. As can be seen from the diagram on FIG. 6E, the blocks whose SER does not exceed the first threshold value correspond to the position of the natural image.

The processor 12 extracts the blocks which include the binary image portion equal to or greater than a predetermined region in the fifth image. The processor 12 detects the position of the binary image portion in the fifth image based on the positions of the extracted blocks. The processor 12 recognizes the traffic sign from a region obtained by connecting the extracted blocks.

Figure 7A:
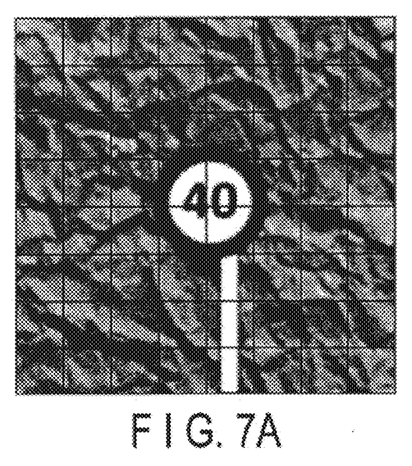
FIG. 7A, FIG. 7B, FIG. 7C, FIG. 7D, and FIG. 7E are a diagram showing recognition of a target.
Figure 7B:
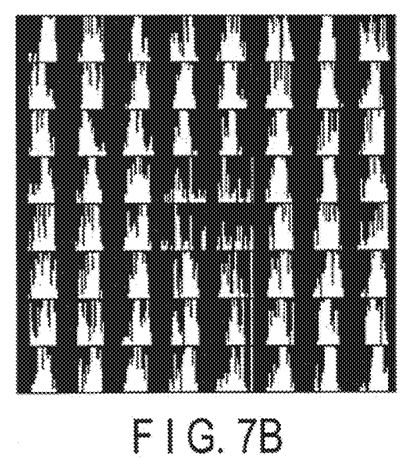

FIGS. 7A-7E are a diagram showing how a symbol portion in a sixth image is recognized according to the first embodiment. The figure on FIG. 7A shows a sixth image. The sixth image is an image of a traffic sign projected in a natural image. The sixth image is less in focus than in the case of the fifth image. In the sixth image, the traffic sign is not as clear as in the fifth image. The processing unit 12 divides the sixth image into the same number of blocks as in the fifth image. The diagram on FIG. 7B is a histogram map obtained by lining up a histogram at a position corresponding to each block of the sixth image.

Figure 7C:
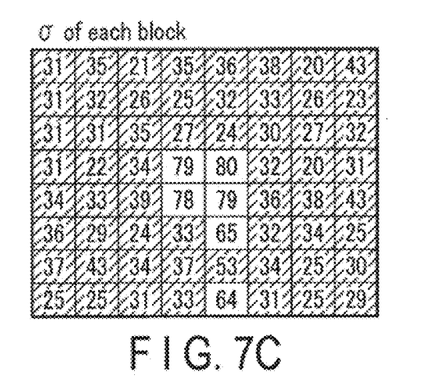
Figure 7D:
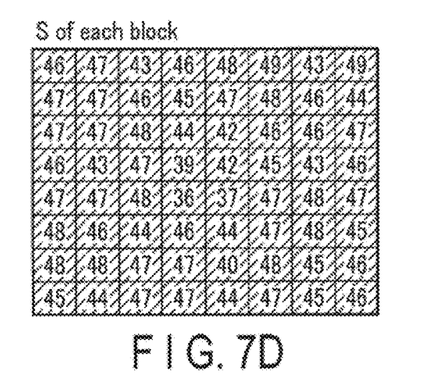

The diagram on FIG. 7C is a σ map obtained by lining up the value of a standard deviation σ at a position corresponding to each block of the sixth image. The diagram on FIG. 7D is an S map obtained by lining up the value of an entropy S at a position corresponding to each block of the sixth image. The diagram on FIG. 7E is an SER map obtained by lining up the value of an SER at a position corresponding to each block of the sixth image.

Referring to the diagram on FIG. 7C, the standard deviation σ of the blocks corresponding to the position of the traffic sign is approximately twice that of the blocks corresponding to the position of the natural image. Therefore, the standard deviation σ of the blocks corresponding to the position of the traffic sign is significantly different from the standard deviation σ of the blocks corresponding to the position of the natural image.

Referring to the figure on FIG. 7D, there is almost no difference between the entropy S of the blocks corresponding to the position of the traffic sign and the entropy S of the blocks corresponding to the position of the natural image. Therefore, the entropy S of the blocks corresponding to the position of the traffic sign is not significantly different from the entropy S of the blocks corresponding to the position of the natural image.

Figure 7E:
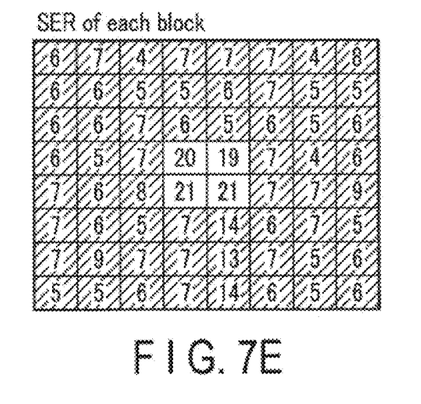

Referring to the diagram on FIG. 7E, the SER of the blocks corresponding to the position of the traffic sign is at least twice that of the blocks corresponding to the position of the natural image. Therefore, the SER of the blocks corresponding to the position of the traffic sign is significantly different from the SER of the blocks corresponding to the position of the natural image. This results from the significant difference in the standard deviation σ. The diagram on FIG. 7E shows blanks in the blocks having an SER exceeding a first threshold value. As can be seen from the diagram on FIG. 7E, the blocks whose SER exceeds the first threshold value correspond to the position of the traffic sign. As can be seen from the diagram on FIG. 7E, the blocks whose SER does not exceed the first threshold value correspond to the position of the natural image.

The processor 12 extracts blocks which include the binary image portion equal to or greater than a predetermined region from the sixth image. The processor 12 detects the position of the binary image portion in the sixth image based on the position of the extracted blocks. The processor 12 recognizes the traffic sign from a region obtained by connecting the extracted blocks.

Figures 8A, 8B, 8C, 8D, 8E:
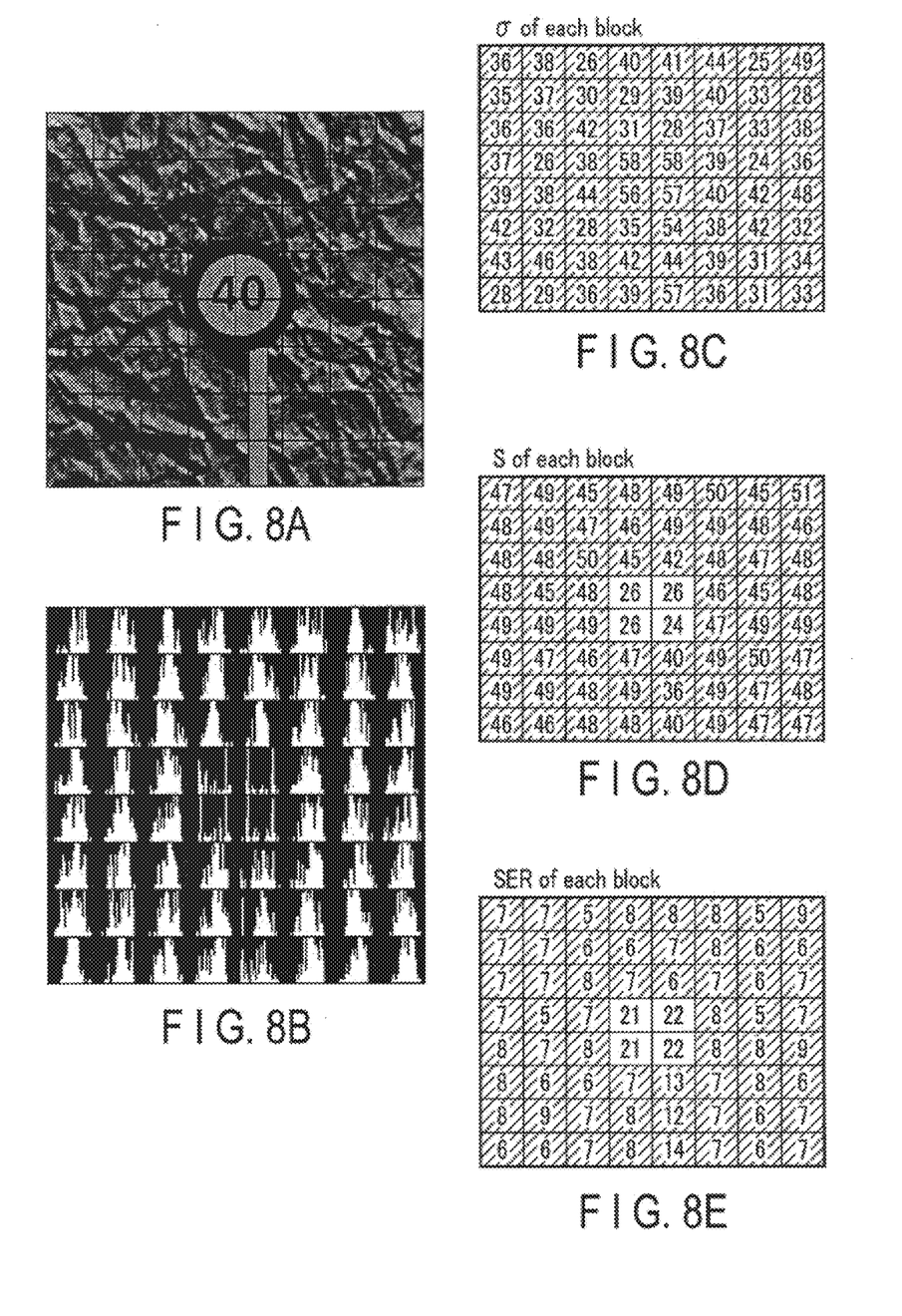
FIG. 8A, FIG. 8B, FIG. 8C, FIG. 8D, and FIG. 8E are a diagram showing recognition of a target.

FIGS. 8A-8E are diagrams showing how a symbol portion in a seventh image is recognized according to the first embodiment. The figure on FIG. 8A shows a seventh image. The seventh image is an image of a traffic sign projected in a natural image. In the seventh image, the contrast of the traffic sign is lower than in the fifth image. The processor 12 divides the seventh image into the same number of blocks as in the fifth image. The diagram on FIG. 8B is a histogram map obtained by lining up a histogram at a position corresponding to each block of the seventh image.

The diagram on FIG. 8C is a σ map obtained by lining up the value of a standard deviation σ at a position corresponding to each block of the seventh image. The diagram on FIG. 8D is a S map obtained by lining up the value of an entropy S at a position corresponding to each block of the seventh image. The diagram on FIG. 8E is an SER map obtained by lining up the value of an SER at a position corresponding to each block of the seventh image.

Referring to the diagram on FIG. 8C, the standard deviation σ of the blocks corresponding to the position of the traffic sign is not much different from the standard deviation σ of the blocks corresponding to the position of the natural image. Therefore, the standard deviation σ of the blocks corresponding to the position of the traffic sign is not significantly different from the standard deviation σ of the blocks corresponding to the position of the natural image.

Referring to the diagram on FIG. 8D, the entropy S of the blocks corresponding to the position of the traffic sign is approximately half that of the blocks corresponding to the position of the natural image. Therefore, the entropy S of the blocks corresponding to the position of the traffic sign is significantly different from the entropy S of the blocks corresponding to the position of the natural image.

Referring to the diagram on the FIG. 8E, the SER of the blocks corresponding to the position of the traffic sign is at least twice that of the blocks corresponding to the position of the natural image. Therefore, the SER of the blocks corresponding to the position of the traffic sign is significantly different from the SER of the blocks corresponding to the position of the natural image. This results from the significant difference in the entropy S. The diagram on FIG. 8E shows blanks in the blocks having an SER exceeding a first threshold value. As can be seen from the diagram on FIG. 8E, the blocks whose SER exceeds the first threshold value correspond to the position of the traffic sign. As can be seen from the diagram on FIG. 8E, the blocks whose SER does not exceed the first threshold value correspond to the position of the natural image.

The processor 12 extracts the blocks which include the binary image portion equal to or greater than a predetermined region. The processor 12 detects the position of the binary image portion in the seventh image based on the positions of the extracted blocks. The processor 12 recognizes the traffic sign from a region obtained by connecting the extracted blocks.

As is explained using FIGS. 6A-6E, 7A-7E, and 8A-8E, the processor 12 is capable of detecting the position of a binary image portion in an image regardless of the image being clear, unclear, or having low contrast, in a short time. Therefore, the processor 12 is capable of recognizing a symbol portion in an image at a short time.

Figure 9:
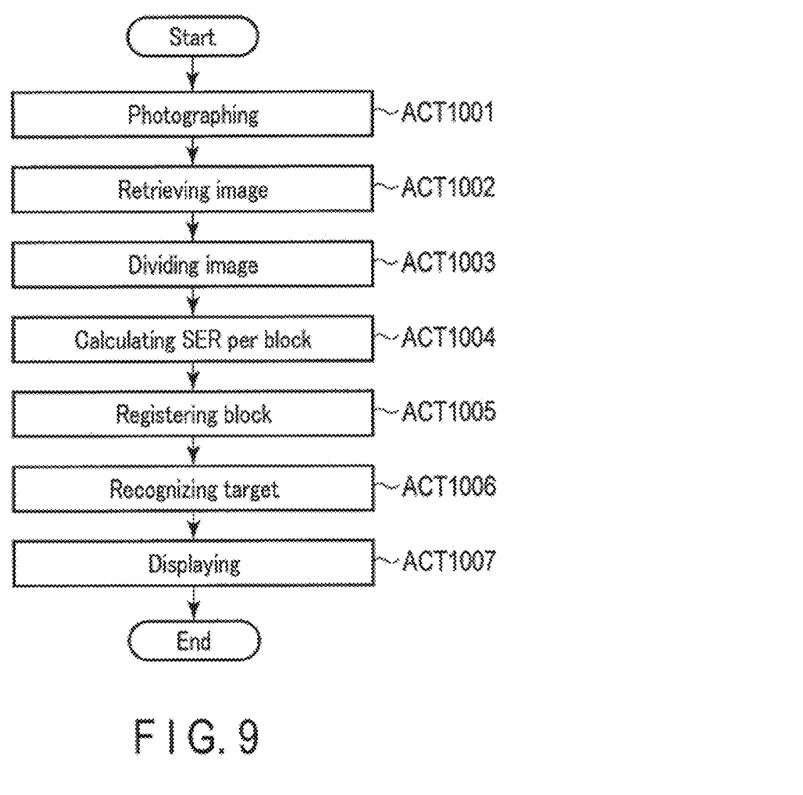
FIG. 9 is a flowchart of processes performed by the image processing apparatus.

An example of processes performed by the image processing apparatus 10 is explained below. FIG. 9 is a flowchart of processes performed by the image processing apparatus 10 according to the first embodiment.

The photographing unit 11 performs photographing while the moving vehicle 20 travels (Act1001). The processor 12 retrieves an image from the photographing unit 11 (Act1002). The image retrieved from the photographing unit 11 by the processor 12 in Act1002 is referred to as an original image.

The dividing unit 122 of the processor 12 divides the original image into a plurality of blocks (Act1003). The calculating unit 123 of the processor 12 calculates the SER per block of the original image (Act1004). In Act1004, the calculating unit 123 of the processor 12 generates a histogram of each block. The calculating unit 123 of the processor 12 calculates a standard deviation σ and an entropy S per block of the original image based on the histograms. The calculating unit 123 of the processor 12 calculates the SER per region of the original image based on the standard deviation σ and the entropy S.

The registering unit 125 of the processor 12 registers the blocks whose SER exceeds the first threshold value in the storage unit 13 (Act1005). In Act1005, the determining unit 124 of the processor 12 determines whether or not the SER exceeds the first threshold value regarding every block of the original image. In this manner, the determining unit 124 of the processor 12 determines the blocks whose SER exceeds the first threshold value out of all of the blocks of the original image. The registering unit 125 of the processor 12 extracts the blocks whose SER exceeds the first threshold value and registers the extracted blocks in the storage unit 13. The position of the blocks whose SER exceeds the first threshold value is the position of the blocks including the binary image portion equal to or greater than a predetermined region, and corresponds to the position of the symbol position. Here, the blocks whose SER exceeds the first threshold value and are registered in the storage unit 13 in Act1005 are referred to as registered blocks.

The recognition unit 126 of the processor 12 recognizes the targeted symbol portion from the original image (Act1006). In Act1006, the recognition unit 126 of the processor 12 detects the position of the binary image portion in the original image based on the position of the registered blocks. The position of the binary image portion corresponds to the position of the registered blocks in the original image. The recognition unit 126 of the processor 12 recognizes the target from a region obtained by connecting the registered blocks. The information of the position of the registered blocks, the position of the binary image portion, and the target acquired by the processor 12 is based on the determination result of the processor 12.

The display unit 14 displays the targeted symbol portion (Act1007). Here, for example, the traffic sign shown in FIGS. 6A, 7A, and 8A will be explained as an example of the symbol portion. In Act1007, the processor 12 sends the video signal of the recognized traffic sign to the display unit 14 as information based on the determination result. For example, the processor 12 can also send the video signal of the traffic sign extracted from the original image to the display unit 14 as information based on the determination result. In this case, the display unit 14 displays the image of the traffic sign extracted from the original image. For example, the processor 12 can also send the video signal of the entire original image in which the traffic sign is projected to the display unit 14 as information based on the determination result. In this case, the display unit 14 displays the entire original image which projects the traffic sign sent from the processor 12. The display unit 14 may also display the traffic sign by superimposing it on a navigation display. In this manner, the display unit 14 will not only be able to display a route to a destination, but also the traffic sign actually recognized by the processor 12 in this route. Therefore, the display unit 14 is capable of displaying information based on the determination result of the processor 12.

The display unit 14 may also display the histogram map as shown in each of FIGS. 6B, 7B, and 8B which is obtained by lining up a histogram at a position corresponding to each block of the image in which the traffic sign is projected. The display unit 14 may also display the SER map as shown in each of FIGS. 6E, 7E, and 8E which is obtained by lining up an SER at a position corresponding to each block of the image in which the traffic sign is projected. The display unit 14 may also highlight the position corresponding to the registered blocks in the image in which the traffic sign is projected.

The processor 12 may send a warning audio signal corresponding to the traffic sign to an audio output unit 15 as information based on the determination result. In this case, the audio output unit 15 is capable of outputting a warning corresponding to the traffic sign by audio. Therefore, the audio output unit 15 is capable of outputting information based on the determination result by audio.

A driver of the moving vehicle 20 would be able to recognize details of the traffic sign easily by the output of the display unit 14 or the audio output unit 15.

As other examples of the first embodiment, after the Act1006, the processor 12 may send the control signal corresponding to the recognized traffic sign as information based on the determination result to the external device via the interface 16. The interface 16 outputs the information based on the determination result of the processor 12 to the external device. For example, if the processor 12 recognizes a speed limit traffic sign, the processor 12 sends the control signal corresponding to the speed limit to the external device via the interface 16. For example, the external device is a control device which controls the operation of the moving vehicle 20. The external device controls steering or braking of the moving vehicle 20 based on the control signal from the processor 12. Even if the processor 12 does not determine the details of the traffic sign, it may also have the external device determine the details of the traffic sign based on the image of the traffic sign sent from the processor 12. According to this example, the processor 20 can be automatically controlled.

As other examples of the first embodiment, the processor 12 may divide the registered blocks further into a plurality of blocks after Act1005. The processor 12 may perform processes similar to those in Act1004 and Act1005 on each of the divided blocks. In other words, after the processor 12 roughly detects the position ox the blocks including the binary image portion in the original image, the processor 12 once again divides the blocks including the binary image portion and detects the position of the binary image portion in detail. In this manner, rather than performing a detailed dividing processing on the original image from the start, the image processing apparatus 10 will be able to detect the position of the binary image portion in a short time. Furthermore, the image processing apparatus 10 will be able to detect the position of the binary image portion in the original image more accurately than by performing a dividing processing only once.

According to the first embodiment, the image processing apparatus 10 is capable of detecting the position of the binary image portion in the image in a short time, for not only gray scale images but also for RGB mixed color images. Therefore, the image processing apparatus 10 is capable of recognizing a symbol portion from an image in a short time.

Second Embodiment

The second embodiment is explained below. The second embodiment is different from the first embodiment in that an image processing apparatus 10 detects a position of a binary image portion based on an image sampled from an original image. Here, those sections which are different from the first embodiment will be explained; the explanation of those sections which are the same as the first embodiment is omitted.

Figure 10:
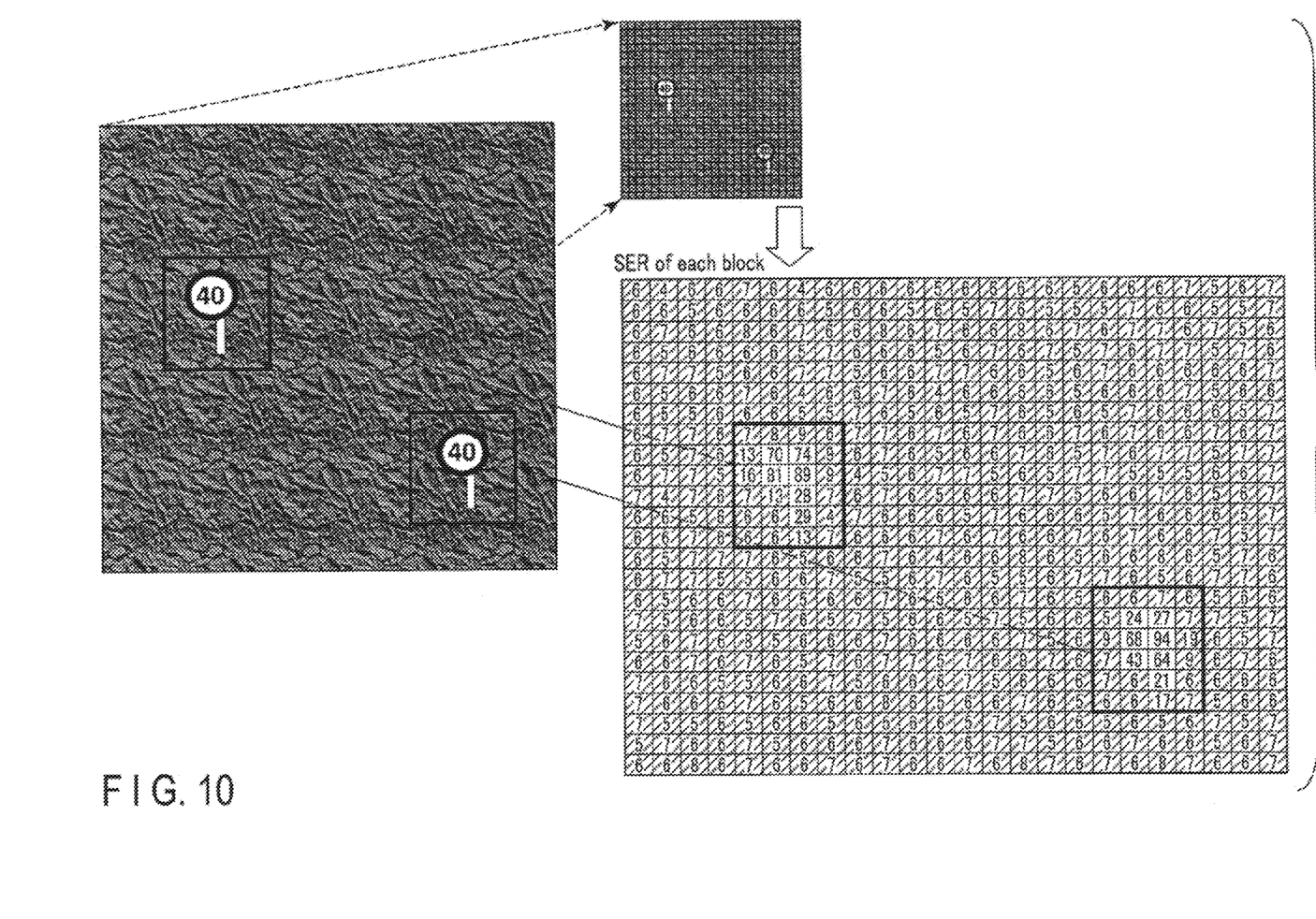
FIG. 10 is a diagram showing recognition of a target.

FIG. 10 is a diagram showing how a position of a binary image portion is detected in an eighth image according to the second embodiment.

The figure on the left side of FIG. 10 shows an eighth image. The eighth image is an image of two traffic signs projected in a natural image. The eighth image is an original image which a processor 12 retrieved from a photographing unit 11. The figure on the upper right side of FIG. 10 shows a ninth image generated from the eighth image by the processor 12. The processor 12 generates the ninth image by sampling pixels from the eighth image. For example, the processor 12 generates the ninth image by sampling a pixel every four pixels from the eighth image vertically and horizontally, respectively. The intervals for sampling the pixels vertically and horizontally, respectively, can be set as desired.

As in the figure shown in the upper right side of FIG. 10, the processor 12 divides the ninth image into a plurality of blocks (regions). The image may be divided into any number of blocks. The size of the divided blocks does not have to be even. In the same manner as the first embodiment, the processor 12 calculates the SER per block. The diagram on the lower right side of FIG. 10 is a two-dimensional SER map obtained by lining up the value of the SER at a position corresponding to each block of the ninth image. The diagram on the lower right side of FIG. 10 shows blanks in the blocks having the SER exceeding a second threshold value. The second threshold value corresponds to a second reference value stored in a storage unit 13. The second reference value is a reference for determining whether or not each block includes a region equal to or greater than a predetermined region of the binary image portion. The second reference value is a value that is set as desired. For example, the second reference value may correspond to the value of the SER of a clear binary image photographed in advance.

The processor 12 compares the SER of each block of the ninth image for recognizing the traffic sign with the second threshold value. The processor 12 determines the blocks whose SER exceeds the second threshold value among the plurality of blocks in the ninth image. The blocks whose SER exceeds the reference value are the blocks including a region equal to or greater than the predetermined region of the binary image portion. As can be seen from the diagram on the lower right side of FIG. 10, the blocks whose SER exceeds the reference value correspond to the position of the traffic sign. However, the blocks whose SER does not exceed the reference value are the blocks which do not include a region equal to or greater than the predetermined region or the binary image portion. As can be seen from the diagram on the lower right side of FIG. 10, the blocks whose SER does not exceed the reference value correspond to the position of the natural image.

The processor 12 extracts the blocks which include a region equal to or greater than the predetermined region of the binary image portion in the ninth image. The processor 12 detects the position of the binary image portion in the eighth image based on the positions of the blocks extracted from the ninth image. Here, the processor 12 detects a region corresponding to the extracted blocks as the position of the binary image portion in the eighth image. The processor 12 recognizes the traffic sign from a region in the eighth image corresponding to the region obtained by connecting the extracted blocks.

Figure 11:
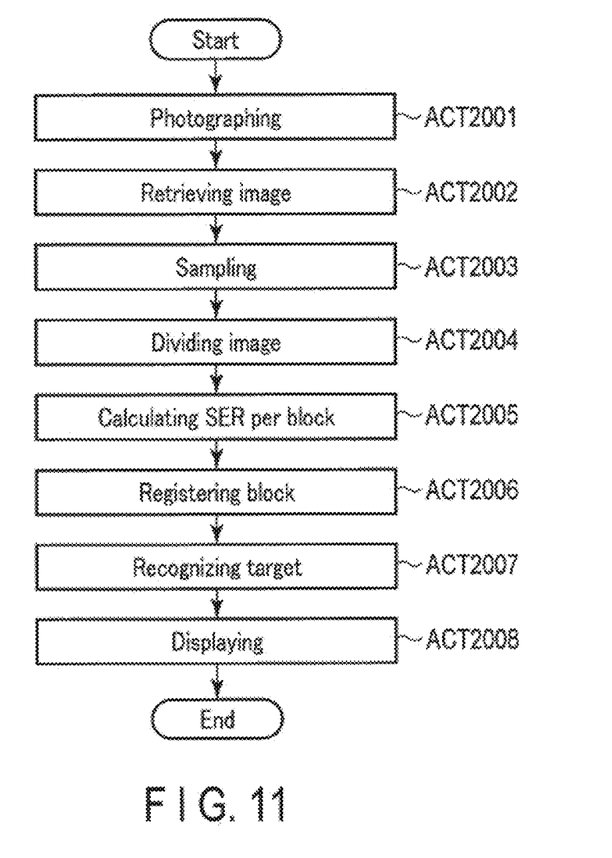
FIG. 11 is a flowchart of processes performed by another image processing apparatus.

An example of the processes performed by the image processing apparatus 10 is explained below. FIG. 11 is a flowchart of an example of processes performed by the image processing apparatus 10 according to the second embodiment.

The photographing unit 11 performs photographing while the moving vehicle 20 travels (Act2001). Act2001 is the same as Act1001 mentioned above. The processor 12 retrieves an image from the photographing unit 11 (Act2002). Act2002 is the same as Act1002 mentioned above.

The generating unit 121 of the processor 12 samples a pixel every several pixels from the original image retrieved from the photographing unit 11 by the processor 12, and generates a reduced image (Act2003). Here, the image generated in Act2003 is referred to as a sampling image.

The dividing unit 122 of the processor 12 divides the sampling image into a plurality of blocks (Act2004). The calculating unit 123 of the processor 12 calculates the SER per block of the sampling image (Act2005). Act2005 is the same as Act1004 mentioned above.

The registering unit 125 of the processor 12 registers the blocks whose SER exceeds the second threshold value in the storage unit 13 (Act2006). Act2006 is the same as Act1005 mentioned above. Here, the blocks registered in the storage unit 13 in Act2006 are referred to as registered blocks.

The recognition unit 126 of the processor 12 recognizes the targeted symbol portion in the original image (Act2007). In Act2007, the recognition unit 126 of the processor 12 detects the position of the binary image portion in the original image based on the position of the registered blocks. Here, the recognition unit 126 of the processor 12 detects a region corresponding to the registered blocks as the position of the binary image portion in the original image. The recognition unit 126 of the processor 12 recognizes the target from a region in the original image which corresponds to a region obtained by connecting the registered blocks.

The display unit 14 displays the targeted symbol portion (Act2008). Act2008 is the same as Act1007.

In the second embodiment, since the image processing apparatus 10 recognizes the symbol port ion based on the sampling image, the processing amount at the image processing apparatus 10 can be reduced from that of the first embodiment. Therefore, the image processing apparatus 10 according to the second embodiment is capable of recognizing a symbol portion from an image in a shorter time than in the first embodiment.

Third Embodiment

Figure 12:
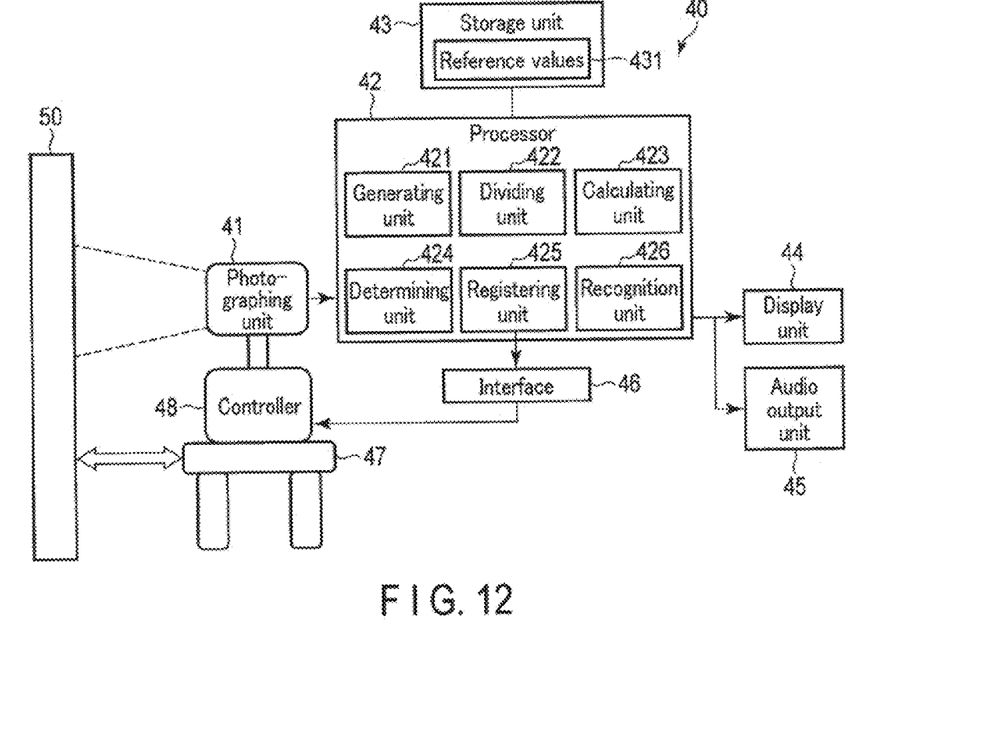
FIG. 12 is a block diagram illustrating an image processing apparatus.

The third embodiment is explained below. The usage of the image processing apparatus 40 according to the third embodiment is different from that of the image processing apparatus 10 according to the first and the second embodiments. FIG. 12 is a block diagram of an image processing apparatus 40 according to the third embodiment.

The image processing apparatus 40 is used for inventory control etc. of a plurality of articles mounted on a shelf 50 of a warehouse or a store. The image processing apparatus 40 comprises a photographing unit 41, a processor 42, a storage unit 43, a display unit 44, an audio output unit 45, an interface 46, a moving vehicle 47, and a controller 48. The image processing apparatus 40 does not need to comprise all of these elements. For example, the image processing apparatus 40 may at least comprise the processor 42 and the storage unit 43.

The photographing unit 41, the processor 42, the storage unit 43, the display unit 44, the audio output unit 45, and the interface 46 are respectively the same elements as the photographing unit 11, the processor 12, the storage unit 13, the display unit 14, the audio output unit 15, and the interface 16.

The processor 42 comprises a generating unit 421, a dividing unit 422, a calculating unit 423, a determining unit 424, a registering unit 425, and a recognition unit 426. The generating unit 421, the dividing unit 422, the calculating unit 423, the determining unit 424, the registering unit 425, and the recognition unit 426 are respectively the same elements as the generating unit 121, the dividing unit 122, the calculating unit 123, the determining unit 124, the registering unit 125, and the recognition unit 126. The storage unit 43 stores a reference value 431 which is the same as the reference value 131 mentioned above.

The moving vehicle 47 is a platform truck which moves the image processing apparatus 40 in any direction. The moving vehicle 47 is capable of traveling in a direction parallel to an extending direction of the linearly disposed shelf 50, or a direction perpendicular thereto.

The controller 48 controls the operation of the moving vehicle 47 based on a control signal from the processor 42. The controller 48 controls the traveling direction of the moving vehicle 47, or a start and stop of the traveling. The operation of the moving vehicle 47 may foe determined either at the processor 42 or the controller 48.

Figure 13:
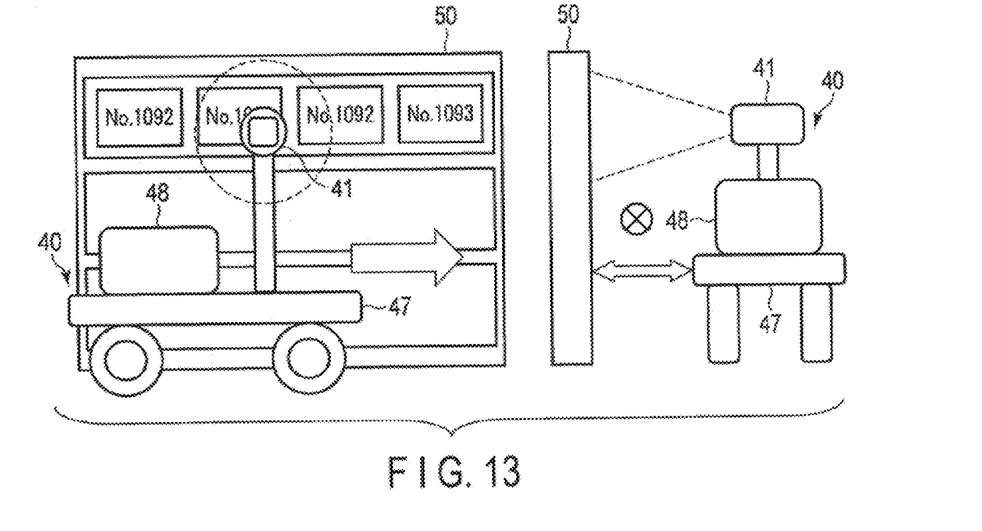
FIG. 13 is a diagram explaining a traveling direction of the image processing apparatus.

FIG. 13 is a diagram explaining the traveling direction of the image processing apparatus 40 according to the third embodiment. The left figure in FIG. 13 and the right figure in FIG. 13 are viewed from right angles to each other. Referring to the left figure in FIG. 13, the moving vehicle 47 travels to move the image processing apparatus 40 in parallel with the extending direction of the shelf 50. Therefore, the photographing unit 41 is capable of photographing each label attached to a plurality of articles mounted on the shelf 50 while moving in parallel with the extending direction of the shelf 50. In the third embodiment, a label portion projected on an image corresponds to a symbol portion. Referring to the right figure in FIG. 13, the image processing apparatus 40 may also stop moving in parallel with the extending direction of the shelf 50, and move in a direction perpendicular to the extending direction of the shelf 50.

The image processing apparatus 40 is capable of recognizing the label portion from an image in a short time by performing the same processes carried out in the first and the second embodiments. The third embodiment is capable of obtaining the same effect as the first and the second embodiments.

As used in this application, entities for executing the actions can refer to a computer-related entity, either hardware, a combination of hardware and software, software, or software in execution. For example, an entity for executing an action can be, but is not limited to being, a process running on a processor, a processor, an object, an executable, a thread of execution, a program, and a computer. By way of illustration, both an application running on an apparatus and the apparatus can be an entity. One or more entities can reside within a process and/or thread of execution and a entity can be localized on one apparatus and/or distributed between two or more apparatuses.

The program for realizing the functions can be recorded in the apparatus, can be downloaded through a network to the apparatus and can be installed in the apparatus from a computer readable storage medium storing the program therein. A form of the computer readable storage medium can be any form as long as the computer readable storage medium can store programs and is readable by the apparatus such as a disk type ROM and a Solid-state computer storage media. The functions obtained by installation or download in advance in this way can be realized in cooperation with an OS (Operating System) or the like in the apparatus.

While certain embodiments have been described, these embodiments have been presented by way of example only, and are not intended to limit the scope of the inventions. Indeed, the novel methods and systems described herein may foe embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An image processing apparatus comprising:
a camera configured to photograph an object and generate an image;
a processor configured to;
receive the image from the camera,
divide the image into a plurality of regions,
calculate a standard deviation and an entropy per region based on tone information of pixels comprising each region,
calculate a ratio between the standard deviation and the entropy,
identify at least one region in the plurality of regions in which the ratio exceeds a reference value,
extract a symbol within the identified at least one region and
an output unit configured to output information corresponding to the extracted symbol.

2. The image processing apparatus according to claim 1, wherein the processor divides the at least one region in which the ratio is determined as exceeding the reference value into a plurality of sub-regions.

3. The image processing apparatus according to claim 1, wherein the output unit displays the information corresponding to the extracted symbol.

4. The image processing apparatus according to claim 3, wherein the output unit displays the information corresponding to the extracted symbol by superimposing it on a navigation display.

5. The image processing apparatus according to claim 1, wherein the output unit outputs the information corresponding to the extracted symbol as audio.

6. The image processing apparatus according to claim 1, wherein the output unit outputs the information corresponding to the extracted symbol to an external device connected to the image processing apparatus.

7. The image processing apparatus according to claim 1, further comprising a moving vehicle configured to move the image processing apparatus.

8. The image processing apparatus according to claim 7, comprising a controller configured to control a movement operation of the moving vehicle based on the information corresponding to the extracted symbol.

9. The image processing apparatus according to claim 1, wherein the processor is further configured to:
sample a subset of pixels less than the total number of pixels comprising each region, and
calculate the standard deviation based on the tone information of the sampled subset of pixels.

10. The image processing apparatus according to claim 1, wherein the extracted symbol is a traffic sign.

11. The image processing apparatus according to claim 1, wherein the extracted symbol is a label on an article.

12. A non-transitory computer-readable storage medium storing a program which causes a computer to:
receive an image from the camera;
divide the image into a plurality of regions;
calculate a standard deviation and an entropy per divided region based on tone information of pixels comprising each region;
calculate a ratio between the standard deviation and the entropy;
identify at least one region in the plurality of regions in which the ratio exceeds a reference value;
extract a symbol within the identified at least one region; and
output information corresponding to the extracted symbol.

13. The non-transitory computer readable storage medium according to claim 12, wherein the extracted symbol is a traffic sign.

14. The non-transitory computer readable storage medium according to claim 12, wherein the extracted symbol is a label on an article.

15. The non-transitory computer readable storage medium according to claim 12, wherein the program further causes the computer to:
sample a subset of pixels less than the total number of pixels comprising each region, and
calculate the standard deviation based on the tone information of the sampled subset of pixels.

16. The non-transitory computer readable storage medium according to claim 12, wherein the program further causes the computer to divide the at least one region in which the ratio is determined as exceeding the reference value into a plurality of sub-regions.

17. The non-transitory computer readable storage medium according to claim 12, wherein the program further causes the computer to display the information corresponding to the extracted symbol.

18. The non-transitory computer readable storage medium according to claim 17, wherein the program causes the computer to display the information corresponding to the extracted symbol by superimposing it on a navigation display.

19. The non-transitory computer readable storage medium according to claim 12, wherein the program further causes the computer to output the information corresponding to the extracted symbol as audio by a speaker.

20. The non-transitory computer readable storage medium according to claim 12, wherein the program further causes the computer to output the information corresponding to the extracted symbol to an external device.

* * * * *